(12) United States Patent
Holtmanns et al.

(10) Patent No.: US 10,284,555 B2
(45) Date of Patent: *May 7, 2019

(54) USER EQUIPMENT CREDENTIAL SYSTEM

(71) Applicant: Nokia Technologies Oy, Espoo (FI)

(72) Inventors: Silke Holtmanns, Klaukkala (FI); Pekka Laitinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 109 days.

This patent is subject to a terminal disclaimer.

(21) Appl. No.: 15/282,995

(22) Filed: Sep. 30, 2016

(65) Prior Publication Data
US 2017/0026371 A1    Jan. 26, 2017

Related U.S. Application Data

(63) Continuation of application No. 11/819,733, filed on Jun. 28, 2007, now Pat. No. 9,485,232.

(Continued)

(51) Int. Cl.
*G06F 7/04* (2006.01)
*H04L 29/06* (2006.01)
(Continued)

(52) U.S. Cl.
CPC ........ *H04L 63/0876* (2013.01); *H04L 9/0825* (2013.01); *H04L 9/3226* (2013.01);
(Continued)

(58) Field of Classification Search
CPC ... H04W 12/06; G06Q 20/322; G06Q 20/401; G06Q 20/02; G06Q 20/0655;
(Continued)

(56) References Cited

U.S. PATENT DOCUMENTS

| 9,485,232 B2 | 11/2016 | Holtmanns et al. |
| 2002/0132605 A1 | 9/2002 | Smeets et al. |

(Continued)

FOREIGN PATENT DOCUMENTS

| WO | WO-00/72506 A1 | 11/2000 |
| WO | WO-03/056746 A1 | 7/2003 |

(Continued)

OTHER PUBLICATIONS

3GPP TS 33.220 V7.3.0. "3rd Generation Partnership Project; Technical Specification Group Services and System Aspects; Generic Authentication Architecture (GAA); Generic bootstrapping architecture (Release 7)", Mar. 2006. <<downloaded Feb. 25, 2016>>.

(Continued)

*Primary Examiner* — Abiy Getachew
(74) *Attorney, Agent, or Firm* — Mintz Levin Cohn Ferris Glovsky and Popeo, P.C.

(57) ABSTRACT

A user equipment in a communications system, the user equipment comprising: a memory arranged to store at least one identifier associated with the user equipment; a transceiver arranged to communicate with a node in the communication system, wherein the transceiver is arranged to receive the at least one identifier from the node in the communications system, wherein the at least one identifier is used by the user equipment to authenticate the user equipment to at least one further node in the communications system.

9 Claims, 4 Drawing Sheets

Related U.S. Application Data

(60) Provisional application No. 60/818,517, filed on Jul. 6, 2006.

(51) Int. Cl.
  *H04L 9/08* (2006.01)
  *H04L 9/32* (2006.01)
  *H04W 12/04* (2009.01)
  *H04W 12/06* (2009.01)

(52) U.S. Cl.
  CPC ............ *H04L 63/08* (2013.01); *H04W 12/04* (2013.01); *H04W 12/06* (2013.01); *H04L 63/06* (2013.01); *H04L 63/0823* (2013.01); *H04L 63/0869* (2013.01); *H04L 2209/80* (2013.01)

(58) Field of Classification Search
  CPC ............ G06Q 20/3276; G06Q 20/367; G06Q 20/382; G06Q 20/3829; G06Q 20/383; G06Q 20/385; G06Q 20/40; G06Q 2220/00; G06Q 30/0201
  See application file for complete search history.

(56) References Cited

U.S. PATENT DOCUMENTS

| | | |
|---|---|---|
| 2004/0128509 A1 | 7/2004 | Gehrmann |
| 2005/0246548 A1 | 11/2005 | Laitinen |
| 2005/0287990 A1 | 12/2005 | Mononen et al. |
| 2006/0020791 A1 | 1/2006 | Laitinen |
| 2006/0079205 A1* | 4/2006 | Semple ............... H04L 63/0869 455/411 |
| 2006/0101270 A1 | 5/2006 | Laitinen |
| 2006/0205388 A1 | 9/2006 | Semple et al. |
| 2006/0265740 A1 | 11/2006 | Clark et al. |
| 2007/0162742 A1 | 7/2007 | Song et al. |
| 2009/0199001 A1* | 8/2009 | Barriga ................ H04L 63/062 713/171 |
| 2010/0050243 A1 | 2/2010 | Hardt |

FOREIGN PATENT DOCUMENTS

| | | |
|---|---|---|
| WO | WO-2005/053267 A1 | 6/2005 |
| WO | WO-2007/110468 A1 | 10/2007 |

OTHER PUBLICATIONS

3GPP TS 33.222 V7.1.0 (Mar. 2006). "3rd Generation Partnership Project; Technical Specification Group Services and System Aspects; Generic Authentication Architecture (GAA); Access to network application functions using Hypertext Transfer Protocol over Transport Layer Security (HTTPS) (Release 7)", Mar. 2006. <<downloaded Feb. 25, 2016>>.

ETSI TS 133 220 V7.4.0, "Universal Mobile Telecommunications Systems (UMTS); Generic Authentication Architecture (GAA); Generic Bootstrapping Architechture (3GPP TS 33.220 version 7.4.0 Release 7)", Jun. 2006, pp. 1-69.

Few 3GPP Release 6/7 Security Features Overview, 3GP Draft; S3-050527.sub.-3GPP.sub.-Security.sub.-Overview.sub.-for.sub.-Tispan-.sub.-WG7, 3rd Generation Partnership Project (3GPP), Mobile Competence Centre; 650, Route Des Lucioles; F-06921Sophia-Antipolis Cedex; France, vol. SA WG3, No. Portorose, Slovenia; Sep. 6, 2005 [retrieved on Sep. 6, 2005]. 45 pages.

Gemplus, "GAA-based terminal to UICC key establishment," 3GPP Draft; S3-050378.sub.-Terminal.sub.-UICC-Key.sub.-Establishment, 3rd Generation Partnership Project (3GPP); Mobile Competence Centre; 650, Route Des Lucioles; F-06921 Sophia-AntipolisCedex; France, vol. SA WG3, No. Montreal; Jun. 21, 2005, Jun. 21, 2005 [retrieved on Jun. 21, 2005]. 4 pages.

Gemplus, "Key establishment between a UICC and a terminal:solution proposal," 3GPP Draft; S3-060024, 3rd Generation Partnership Project (3GPP); Mobile Competence Centre; 650, Route Des Lucioles; F-06921 Sophia-Antipolis Cedex; France, vol. SA WG3,No. Bangalore;Jan. 30, 2006, Jan. 30, 2006 [retrieved on Jan. 30, 2006] 8 pages.

* cited by examiner

USER EQUIPMENT CREDENTIAL SYSTEM

CROSS REFERENCE TO RELATED APPLICATIONS

This application is a continuation application of U.S. patent application Ser. No. 11/819,733, filed Jun. 28, 2007, entitled "USER EQUIPMENT CREDENTIAL SYSTEM," which claims priority to U.S. Provisional Application No. 60/818,517, filed Jul. 6, 2006, entitled "USER EQUIPMENT CREDENTIAL SYSTEM." The contents of all of the aforementioned applications are hereby incorporated by reference in their entirety.

BACKGROUND OF THE INVENTION

Field of the Invention

The present disclosure relates to security in a communications system, and more particularly, but not exclusively, to management and creation of user security related data and credentials for user equipment.

Description of the Related Art

A communication system can be seen as a facility that enables communication sessions or data sessions between entities such as user equipment and/or other nodes associated with the communication system. The communication may comprise, for example, communication of voice, data, multimedia and so on. An user equipment connected to a communication system may, for example, be provided with a two-way telephone call or multi-way conference call or with a data connection. In addition voice call services, various other services, for example enhanced content services such as multimedia services or other data services, security services may be provided for a user. An user equipment may communicate data to and from a server entity, or between two or more user equipments.

A communication system typically operates in accordance with a given standard or specification, which sets out what the various entities associated with the system are permitted to do and how that should be achieved. Communication protocols, parameters, functions, reference points and interfaces, which shall be used for a connection are typically defined by the standards or specifications.

Communication systems providing wireless communication for user equipment are known. These systems are commonly referred to as mobile systems, although in certain systems the mobility may be restricted to substantially small areas. An example of the mobile systems is the public land mobile network (PLMN). Another example is a mobile system that is based, at least partially, on use of communication satellites. Mobile communications may also be provided by means of other types of systems, such as by means of wireless local area networks (WLAN), Personal Area Networks (PAN), Wide Area Networks (WAN) or some other form of network that provides Internet Protocol (IP) access.

In a wireless system an access node provides user equipment with access to the communication system. An user equipment may be in wireless communication with two or more access nodes at the same time. Communication on the wireless interface between the user equipment and the access node(s) can be based on an appropriate communication protocol. Examples of the various wireless access systems include CDMA (Code Division Multiple Access), WCDMA (Wide-band CDMA), TDMA (Time Division Multiple Access), FDMA (Frequency Division Multiple Access), or SDMA (Space Division Multiple Access), Institute of Electrical and Electronics Engineers (IEEE) 802.11, DECT (Digital Enhanced Cordless Communication), WLAN, WAN or cable connection and further developments and hybrids thereof.

The operation of the network apparatus is controlled by an appropriate control arrangement commonly including a number of various control entities. One or more gateways or intermediate servers may also be provided for connecting a network to other networks or hiding network internal details from external nodes. For example, a PLMN network may be connected to other mobile or fixed line communication networks or data communication networks such as an IP (Internet Protocol) and/or other packet data networks.

A user or the user equipment may need to be authenticated before he/she is allowed to access or otherwise use various applications and services. This may be required for security and privacy reasons, but also to enable correct billing of the service usage. For example, it may need to be verified that the user is whoever he/she claims to be, that the user has the right to use a certain service, that the user can be provided with an access to sensitive information and so on. In an authentication process, a user can be identified based on various values associated with the user known to a third party.

Various authentication mechanisms are already in place, or have been proposed. A non-limiting example is an authentication mechanism proposed by the third generation partnership project (3GPP) called the 'Generic Authentication Architecture' (GAA) or the GAA version defined by the Third Generation Partnership Project 2 (3GPP2). The GAA is indented to be used as a security procedure for various applications and services for users of mobile user equipment, such as mobile stations for cellular systems. GAA based security credentials can be used for authentication, but also for other security purposes, like integrity and confidentiality protection of messages. The GAA is intended to be based on shared secrets that are stored on specific secure storage entities provided in association with the user equipment and subscriber databases. The secure storage and credential generation entity of a user equipment may be provided by an appropriate security function, for example a security module, an identification module or another secure environment in the user equipment. Also, the storage and the credential generation can be performed by two different entities. The subscriber database may be provided by an appropriate network entity, for example a Home Location Register (HLR), Home Subscriber Server (HSS), Authentication Authorization and Accounting (AAA) server or Domain Name Service (DNS) server like database.

Furthermore in 3GPP there has been proposed (3GPP TS 33.220) an authentication infrastructure. This infrastructure may be utilised to secure interworking with application functions in the network side and on the user side to communicate in situations where they would not otherwise be able to do so. This functionality is referred to as "bootstrapping of application security", or more generally simply as "bootstrapping", which is carried out in generic bootstrapping architecture (GBA).

The general principles of bootstrapping are that a generic bootstrapping server function (BSF) allows user equipment (UE) to authenticate therewith, and agree on session keys, which are then used for a secure interaction between a Network Application Function (NAF) and the UE. Such authentication is preferably based on authentication and key agreement (AKA). By running AKA algorithms, the mobile terminal and the network mutually authenticate each other and agree on service specific session keys. After this authentication, the UE and an network application function (NAF), which may also be referred to as a service provider, may run some application specific protocol where the security of messages is based on the service specific session keys agreed between the UE and the BSF.

The bootstrapping function procedure is not intended to be dependent upon any particular network application function. The server implementing the bootstrapping function must be trusted by the home operator to handle authentication vectors. Network application functions in the operator's home network are to be supported, but also the support of network application functions in a visited network, or even in a third network is possible.

In the proposals for implementation of bootstrapping techniques, it is proposed that the UE sends a service request to a NAF. The NAF must then communicate with the BSF in order to retrieve the service specific session key(s) required for authentication with the UE.

Typically as described above the secure storage entity of a user equipment is provided by an appropriate security function, for example a security module, or an identification module such as a universal integrated circuit card (UICC) or a trusted environment in the terminal.

This approach has limitations. Firstly when the device is not intended to be used as a conventional telephone and therefore does not contain a UICC or equivalent subscriber information module (SIM) card. For example a user attempting to access a network function with a handheld device such as the Sony PlayStation Portable (PSP) would not be able to authenticate the user due to a lack of a UICC. Furthermore a user operating a tablet PC, personal digital assistant (PDA) personal computer or laptop connecting over a wireless or fixed link would not be able to access the network function and gain access to the service that the user may be used to from his mobile subscription. Also, it is currently not possible to have a generic single sign on process to NAF-based services over different access networks with an authentication that is bound to the presence of a UICC or similar smart card. Hence, users are required to remember a large range of passwords and Personal Identification Numbers (PIN) e.g. for Voice over IP solutions, access to his mobile phone, web service access etc.

Secondly where the device is to be used by more than one person, the switching between users requires the user equipment to be powered down, have the current UICC removed, the new UICC for the next user inserted and the user equipment to be powered back up, which is time consuming, user unfriendly, battery draining process and potentially capable of damaging the UICC. Although an integrated security module overcomes the problem of switching the UICC it also prevents the independent monitoring of each user. For example the device with a single module with a single ID would require further control entities to prevent children from being able to access adult material.

SUMMARY OF THE INVENTION

Embodiments of the present invention aim to address one or several of the above problems.

There is provided according to the invention a user equipment in a communications system, the user equipment comprising: a memory arranged to store at least one identifier associated with the user equipment; a transceiver arranged to communicate with a node in the communication system, wherein the transceiver is arranged to receive the at least one identifier from the node in the communications system, wherein the at least one identifier is used by the user equipment to authenticate the user equipment to at least one further node in the communications system.

The at least one identifier preferably comprises a first identifier, wherein the first identifier is preferably a publicly known identifier.

The first identifier is preferably at least one of: a user name; a public cryptographic key; an IP address; and a caller line identification value.

The at least one identifier preferably comprises a second identifier, wherein the further identifier is preferably a private identifier known to the user equipment and node only.

The second identifier is preferably at least one of: a password value; and a private cryptographic key.

The transceiver is preferably arranged to transmit the first identifier to the further node to initiate the authentication of the user equipment at the further node.

The transceiver is preferably arranged to receive an authentication message from the further node.

The user equipment preferably further comprises a processor, the processor being arranged to process the authentication message.

The processor is preferably arranged to generate a cryptographic key for encrypting communications between the user equipment and further node in dependence on the processed authentication message and the second identifier.

The processor is preferably arranged to generate a cryptographic key for encrypting communications between the user equipment and further node in dependence on the processed authentication message and a result of a one way function of the second identifier.

According to a second aspect of the invention there is provided a method for authenticating a user equipment in a communications system, the method comprising: receiving at a user equipment from a node in the communications system at least one identifier associated with the user equipment; storing at the user equipment the at least one identifier; wherein the at least one identifier is used by the user equipment to authenticate the user equipment to at least one further node in the communications system.

The at least one identifier preferably comprises a first identifier, wherein the first identifier is preferably a publicly known identifier.

The first identifier is preferably at least one of: a user name; a public cryptographic key; an IP address; and a caller line identification value.

The at least one identifier preferably comprises a second identifier, wherein the further identifier is preferably a private identifier known to the user equipment and node only.

The second identifier is preferably at least one of: a password value; and a private cryptographic key.

The method for authenticating a user equipment preferably further comprising the step of transmitting the first identifier from the user equipment to the further node to initiate the authentication of the user equipment at the further node.

The method for authenticating a user equipment preferably further comprising the step of receiving at the user equipment an authentication message from the further node.

The method for authenticating a user equipment preferably further comprising the step of processing the authentication message received at the user equipment.

The method for authenticating a user equipment preferably further comprising the step of generating a cryptographic key for encrypting communications between the user equipment and further node in dependence on the processed authentication message and the second identifier.

The method for authenticating a user equipment preferably further comprising the step of generating a cryptographic key for encrypting communications between the user equipment and further node in dependence on the processed authentication message and a result of a one way function of the second identifier.

According to a third aspect of the invention there is provided a computer program arranged to operate a computer to perform a method for authenticating a user equipment in a communications system, the method comprising: receiving at a user equipment from a node in the communications system at least one identifier associated with the user equipment; storing at the user equipment the at least one identifier; wherein the at least one identifier is used by the user equipment to authenticate the user equipment to at least one further node in the communications system.

According to a fourth aspect of the invention there is provided a network comprising: at least one user equipment, a node and at least one further node, the user equipment comprising: a memory arranged to store at least one identifier associated with the user equipment; a transceiver arranged to communicate with the node wherein the transceiver is arranged to receive the at least one identifier from the node, wherein the at least one identifier is used by the user equipment to authenticate the user equipment to the at least one further node in the network.

The at least one identifier preferably comprises a publicly known identifier.

The at least one identifier preferably comprises a private identifier known to the user equipment, the node and further node only.

The at least one identifier is preferably at least one of: a user name; a public cryptographic key; an IP address; a caller line identification value; a password value; and a private cryptographic key.

The node preferably comprises a credential server.

The further node preferably comprises at least one of a network application function node and a bootstrapping function node.

According to a fifth aspect of the invention there is provided a node in a communications system comprising: a memory arranged to store at least one identifier associated with the user equipment; a transceiver arranged to communicate with the user equipment, wherein the transceiver is arranged to transmit the at least one identifier from the node to the user equipment, wherein the at least one identifier is used by the user equipment to authenticate the user equipment to at least one further node in the communications system.

The at least one identifier preferably comprises a publicly known identifier.

The at least one identifier preferably comprises a private identifier known to the user equipment the node and the further node only.

The at least one identifier is preferably at least one of: a user name; a public cryptographic key; an IP address; a caller line identification value; a password value; and a private cryptographic key.

The node is preferably a credential server.

The further node is preferably at least one of a bootstrapping server and a network application server.

According to a sixth aspect of the invention there is provided a node in a communications system, for providing a user equipment a bootstrapping function comprising: a memory arranged to store at least one identifier associated with the user equipment; a transceiver arranged to communicate with the user equipment wherein the transceiver is arranged to receive the at least one identifier from the user equipment and wherein the at least one identifier is used by the user equipment to authenticate the user equipment.

The at least one identifier preferably comprises at least one of a publicly known identifier.

The at least one identifier is preferably at least one of: a user name; a public cryptographic key; an IP address; a caller line identification value; a password value; and a private cryptographic key.

The transceiver is preferably arranged to receive the at least one identifier from the UE, and wherein the node is arranged to initiate the authentication of the user equipment on receipt of the at least one identifier.

The transceiver is preferably arranged to transmit an authentication message to the user equipment.

The node preferably further comprises a processor, wherein the processor is arranged to generate a cryptographic key.

The transceiver preferably is arranged to transmit the cryptographic key to an application function server in dependence on a processed authentication message.

The cryptographic key is preferably arranged to secure communications between the user equipment and the application function server.

The node preferably comprises a bootstrapping function server.

According to a seventh aspect of the invention there is provided a node in a communications system, for providing a user equipment a application function comprising: a memory arranged to store at least one identifier associated with the user equipment; a transceiver arranged to communicate with a further node to receive the at least one identifier from a further node, wherein the at least one identifier is used to authenticate the user equipment.

The at least one identifier preferably comprises at least one publicly known identifier.

The at least one identifier is preferably at least one of: a user name; a public cryptographic key; an IP address; a caller line identification value; a password value; and a private cryptographic key.

The transceiver is preferably further arranged to communicate with the user equipment to receive at least one further identifier from the UE, and wherein the node is arranged to initiate the authentication of the user equipment on receipt of the at least one further identifier.

The transceiver is preferably further arranged to transmit an authentication message to the user equipment.

The transceiver is preferably further arranged to receive from the further node a cryptographic key.

The cryptographic key is preferably arranged to secure communications between the user equipment and the node.

The node preferably comprises a network application server.

BRIEF DESCRIPTION OF DRAWINGS

For better understanding of the present invention, reference will now be made by way of example to the accompanying drawings in which.

DETAILED DESCRIPTION OF THE PREFERRED EMBODIMENTS

Some exemplifying and non-limiting embodiments of the invention are discussed below with reference to a mobile communication network such as a public landline mobile network (PLMN), for example used for a Digital Subscriber Line (DSL) connection. Before explaining these in more detail, a communication system comprising at least a PLMN is briefly explained with reference to FIG. 1.

Figure 1:
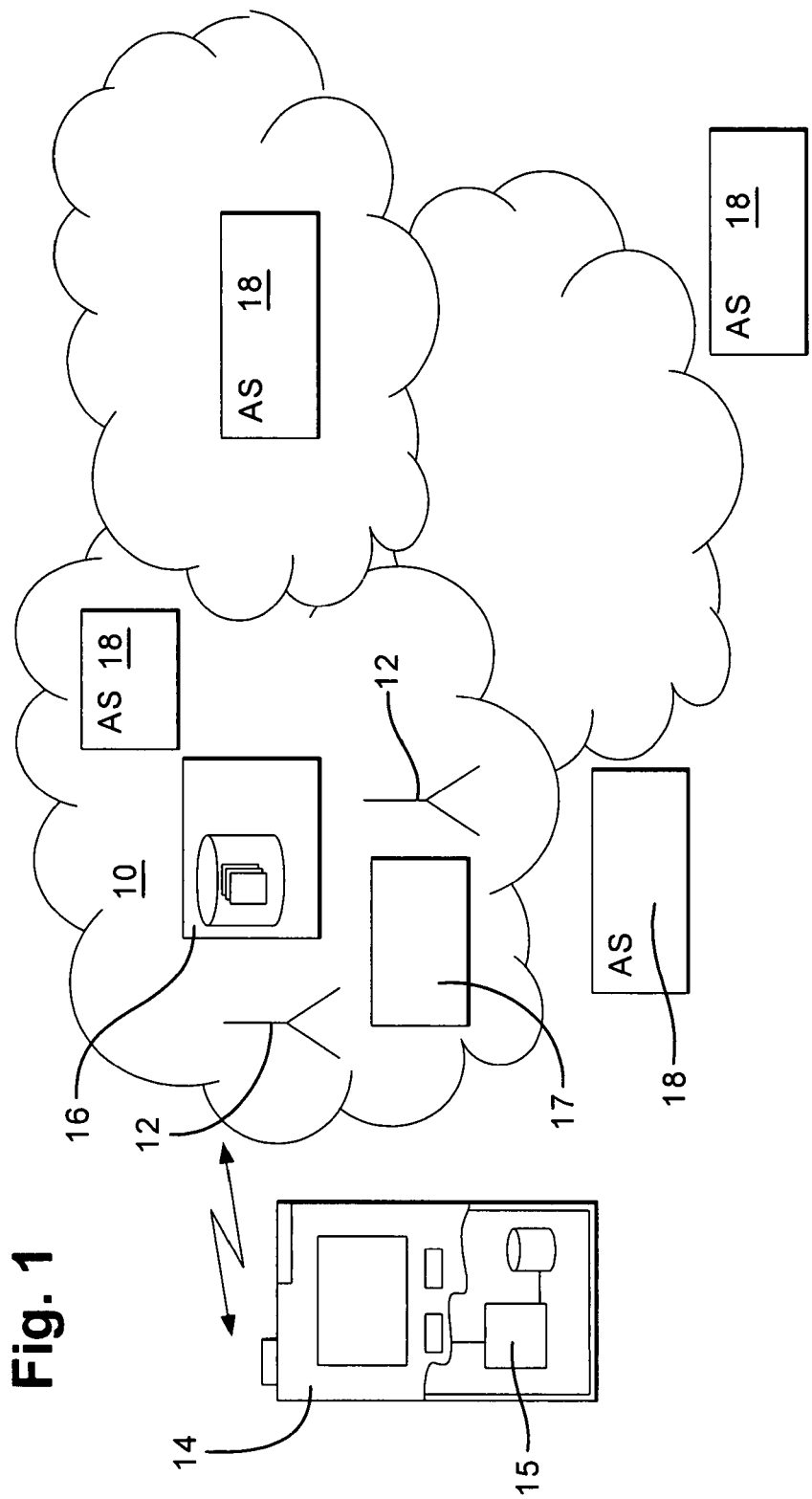
FIG. 1 shows a communication system wherein the present invention may be embodied.

In a PLMN 10 a number of base stations 12 are arranged to wirelessly transmit signals to and receive signals from a plurality of mobile user equipment 14 (of which one is shown in FIG. 1). Likewise, mobile user equipment 14 is able to transmit wireless signals to and receive signals from base stations 12. The operation of the network 10 is typically controlled by means of appropriate controller entities. Data required for the operation of the PLMN is typically stored in appropriate data storage entities and servers.

FIG. 1 shows a data storage 16 configured to store data relating to the authenticity of the user. This data storage is also known as a credential server. The credential server is arranged to store data known as a secret credential or shared secret, which is selected or generated and known only to the credential server and the user. A credential can be a cryptographic key, a password or another form of security token.

This shared secret in a first embodiment of the invention is a credential generated when the user registers at the credential server for the first time. For example when a user registers to a Voice over IP service they may be asked to provide or generate a password in combination with a user name. This combination is typically used by the user to connect to the service. Although the user name is known to other parties the password is kept secret from all others except the user and the credential server. Sometimes even the username is considered to be secret.

In other embodiments of the present invention the credential is passed from the credential server 16 to the user equipment 14. In some embodiments of the invention the UE and the credential server each store a secret credential value associated with the UE and known only to each other. From this secret credential value there may be derived a certificate, username/password pair, or one or two secondary secret credentials. These secondary credential values are known to the network and a service providing entity (the service providing entity may be in some embodiments of the invention a third party).

In other embodiments of the present invention a credential is a public/private cryptographic key pair shared between the credential server 16 and the user equipment 14. In other embodiments other data may be used to in association with the credential to identify the user such as the caller line identifier value.

The user equipment (UE) 14 can be provided by any appropriate user terminal. The user equipment may contain or have access to one or more secure environments. In a mobile communications system, the user equipment constitutes a mobile terminal, for example a mobile telephone, a personal digital assistant (PDA) or a mobile PC (personal computer), or the like.

For use in a wireless communications system, the user equipment comprises receive and transmit circuitry and means for receiving and transmitting wireless signals for implementing calls and other signaling channels so that it is enabled to communicate with the base stations 12, for example to make voice call and to send and receive data. The user may also connect his device directly to a cable based network and therefore access services that reside in the wireless communication system via the IP protocol. The user equipment may also be enabled to process control instructions it may receive from, the network and to send control information to the network.

A user may access various applications, for example service applications via the network he or she has access to. An application may be provided by a provider entity, for example any of service provider application servers 18. It is noted that the application servers (AS) need only be connected to the mobile network, but are not necessarily a part of the mobile network. The application server may be some kind of broadcasting server. This means that the operator of the network 10 may not necessarily have any or may only have a limited control on the operation of an application provider. Furthermore, a communication system may be provided by a plurality of different communication networks. Thus the application provider entity may be connected to another network than the network the user subscribes to. Also the network where a user has subscribed to may consist out of several network types, for example, UMTS, fixed line, WLAN or similar all run by the same operator.

A user or the user equipment commonly needs to be authenticated before he/she is allowed to access or otherwise use various applications and services via the network. Also the communication may be required to be secured. FIG. 1 shows a security management server 17 adapted for user authentication. The security management server is capable of key generation. For example, the server 17 provides a bootstrapping function based on secret credential values stored in a credential database that may be part of the security management server or connected to it.

A user can be identified by the security management server 17 based on various credentials. These can be divided into public and private cryptographic key credentials or secret credentials. The secret credentials and private keys from the public/private key pairs are, as described above, typically only known by the operator whereas the public key credentials may be made public. Sometimes also semi-public credentials are used, for example IP addresses. Non-limiting examples of secret user credentials include International Mobile Subscriber Identity (IMSI) and Internet Protocol Multimedia Private Identity (IMPI). Non-limiting examples of public credentials include Mobile Subscriber Integrated System Digital Number (MSISDN), calling line identifier (CLF) and IP Multimedia Public Identity (IMPU).

To maintain the identity information user equipment 14 may be provided with an memory 15 arranged to store authentication information. The memory can be arranged to store a secure credential that is arranged to enable the networks to ensure that the user is who they claim to be or to secure a communication link. The memory may contain a number of security and other applications. A user may have several kinds of user identities, session credentials and service identifiers that are stored in the memory. The memory 15 in embodiments of the invention stores the shared secrets (with the subscriber data storage) and stores security keys generated from the shared secret. The generated shared secret may also be stored in a secondary memory that is connected to the primary memory that holds the shared secrets with the subscriber data storage. The secret credential values (shared keys with the subscriber data storage) may then be used in creation and receiving of trusted connections between the user equipment and an application, such as broadcasting content protection.

Figure 2:
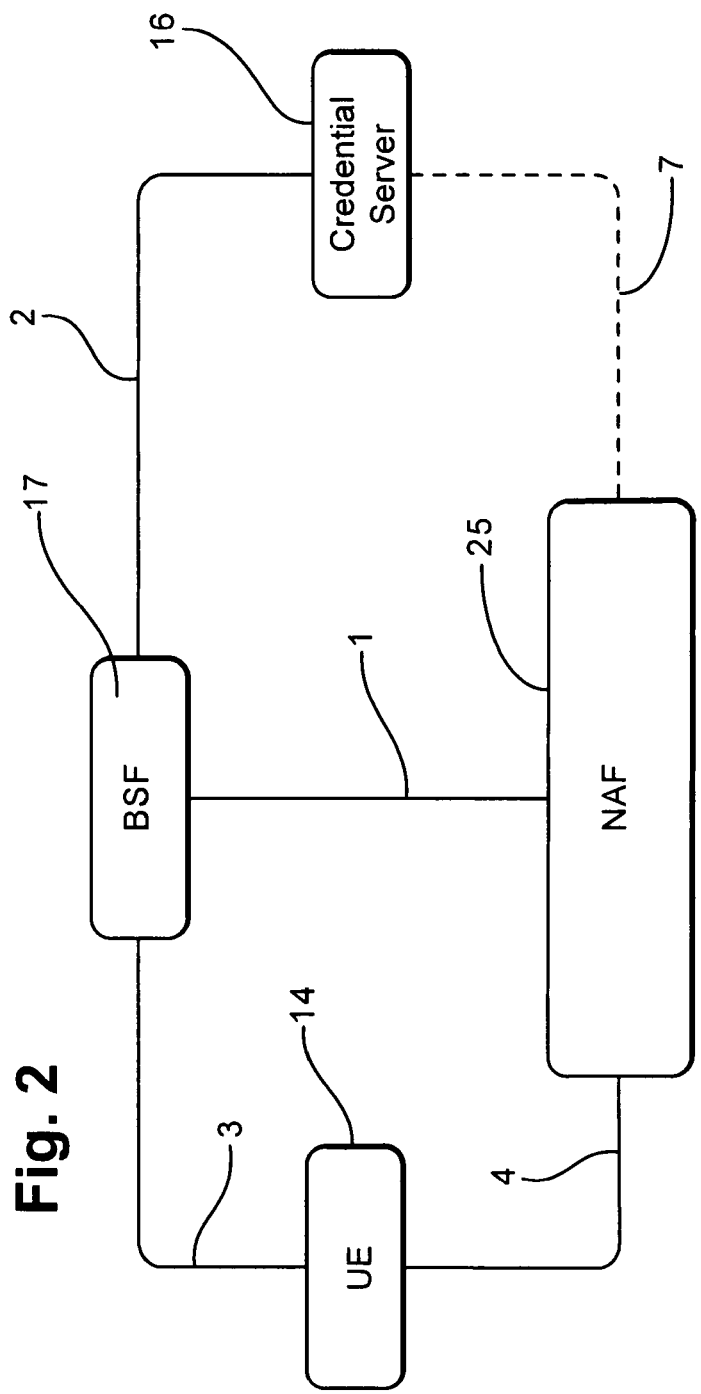
FIG. 2 shows the schematic view of a communications architecture wherein the present invention may be embodied.

FIG. 2 shows an example of the server architecture within which the embodiments of the present invention operate. More particularly, FIG. 2 is a schematic block diagram of an improved arrangement, which in its non improved form is known as a generic authentication architecture (GAA) in accordance with the 3GPP system.

The improved generic authentication architecture (GAA) comprises a user equipment 14 which can communicate to a network application function (NAF) server 25 over an appropriate interface 4, for example an Ua interface. The network application server 25 is also known as the application server as shown in FIG. 1. The user equipment (UE) 14 can also communicate to a security management server (bootstrapping function (BSF) server) 17 via an appropriate interface 3, for example an Ub interface. But the data necessary for credential generation may also be pushed from the NAF over the Ua interface 4 to the UE or directly from the BSF to the UE. The security management server (the BSF server) 17 can communicate with the NAF server 25 over an appropriate interface 1, for example a Zn interface. The security management server (BSF server) 17 can communicate with the data storage 16 configured to store subscriber information (which in a first embodiment of the invention is a credential server) via the interface 2, for example a Zh interface. The BSF may also contain itself the security data storage e.g. in form of an AAA server functionality of extended DNS server functionality. The NAF server 25 can in further embodiments of the invention be connected directly to the data storage 16 configured to store subscriber information over an appropriate interface 7 (represented in FIG. 2 as a dashed line), for example a Sh or Zh interface. Although not shown in FIG. 2, in some embodiments the user equipment 14 is connected to the credential server 16, in order that the UE 14 and Credential server swap the shared secret (e.g. username, password), calling line identifier, IP address or shared cryptographic keys (public/private key pairs). Although this has been described above in relation to one embodiment by the passing of data using a Network Attachment Subsystem (NASS) bundled authentication process, cable network, other ways of exchanging this information can be used. For example the information may be passed to the user off line—in the form of a letter, or as a file or part of a file on a portable media form (e.g. on a CD, DVD or removable flash memory unit). A one-way function may just cut off parts of a value that was the input to the function, but may also perform a sophisticated cryptographic algorithm.

In the following section three different credential combinations are described as non exhaustive examples of the type of credential that can be created as an initial step by the user to authenticate himself or herself in the absence of the use of the conventional identifiers as provided by the UICC.

GBA-PKI (Generic Bootstrapping Architecture-Public Key Infrastructure)

In a first embodiment of the present invention, the secret credential Ks shared by the UE 14 and the credential server 16 is a result of a one way function which has as the input a private cryptographic key associated with the user. The cryptographic key is generated as part of a private/public key pair. The result of a one way function of the private key is in one embodiment generated at the UE 14 and passed to the credential server 16 in a secure way. In an alternate embodiment the key pair and the result of a one way function value is generated at the credential server 16 and passed to the UE in a secure way. In some embodiments the public key is distributed at the same time and in the same manner. In some embodiments the key pair is generated at a key generator server (not shown in FIG. 1) and distributed in a secure way to both the UE 14 and the credential server 16. In some embodiments of the invention the result of, a one way function credential also includes the public key data or could contain the whole certificate.

The result of a one way function of the private key described above (which may also contain the public key and or the whole certificate) is associated with the user at the credential server by the means of public or semi-public credential. The public or semi public credential associated with the shared credential for example is the "username" data field used to register on the credential server. In a further example the public credential is the caller line identity value—a number which indicates from which PSTN connection the connection to the network is coming from. This although specifies only that the user is connected from a specific physical locality.

GBA-LA (Generic Bootstrapping Architecture-Line Authentication)

In a further embodiment of the present invention the secret credential Ks shared between the UE 14 and the credential server 16 is the password data field used when initially registering the user at the credential server. In some embodiments of the invention the secret credential shared between the UE 14 and the credential server 16 is a one way function of the password data field (The one way function receives a first value and returns an output or value in dependence of a known mapping or one way function). The user would provide his full password for authentication, but the value stored would be the one way function applied to the password. This value may in some embodiments also include some additional data (called salt) to make it harder for an attacker to derive an analogous value as a result of the one way function. In a further embodiment additional values generated either by the UE 14 or the credential server 16 or both are added to the one-way-function to produce the credential Ks. After applying the one way function, the resulting value may need to be reduced, due to length restrictions. The additional value can be for example a random value or a current timestamp. In a further embodiment of this type the private or secret credential is a credential value which is generated by a network gateway between the UE 14 and credential server 16. The credential value is distributed securely to the UE 14 and credential server 16.

The public or semi public credential described above is associated with the user equipment at the credential server. The public or semi-public credential associated with the user is the caller line identity value—a number which indicates to the network which PSTN connection the UE 14 is connected via. The operator may also map the calling line identifier to an IP address and use the IP address as the semi-public credential and instead or additionally to the calling line identifier.

GBA-PW (Generic Bootstrapping Architecture-Password Authentication)

In a further embodiment of the present invention the secret credential Ks shared between the UE 14 and the credential server 16 is the password data field used when initially registering the user at the credential server 16. In some embodiments of the invention the secret credential shared between the UE 14 and the credential server 16 is a one way function result of the password data field (The one way function receives a first value, the password value, and returns an output value in dependence of a known mapping or one way function). In a further embodiment additional values generated either by the UE 14 or the credential server 16 or both are added to the one-way-function to produce the secret identifier Ks. The additional value or values can be for example random values or current timestamps.

The public or semi-public credential is associated with the user at the credential server. The unique identifier associated with the public credential for example is the "username" data field initially used to register at the credential server.

The exemplifying embodiments of the present invention will be described with reference to the improved GAA (GBA) architecture as discussed in more detail below with regards to authorization of an user equipment 14 in accessing a specific application from a network application function server 25. Various possible components thereof will be described only briefly as the operation of these is not essential for embodying the invention.

The user equipment 14 communicates with an application entity, for example a network application function (NAF) server 25. The NAF server 25 provides a service to the user equipment 14 but before the network application function server 25 can deliver its services to the user equipment 14 in a secure manner an service specific authentication procedure and/or secure communication is needed that our invention bases on one of the three examples above If the user equipment 14 wishes to access an application from the NAF server 25 but has not undergone an authentication that has resulted in the BSF recovering authentication key material or that the material recovered is no longer valid, the user equipment 14 undergoes an initial authentication procedure also known as bootstrapping. This can occur for example when a new user operates the user equipment or if a user has not used the user equipment for a predetermined time or had previously 'logged out' from the user equipment. In all three of the above examples the user using the UE is required to be authenticated.

Figure 3:
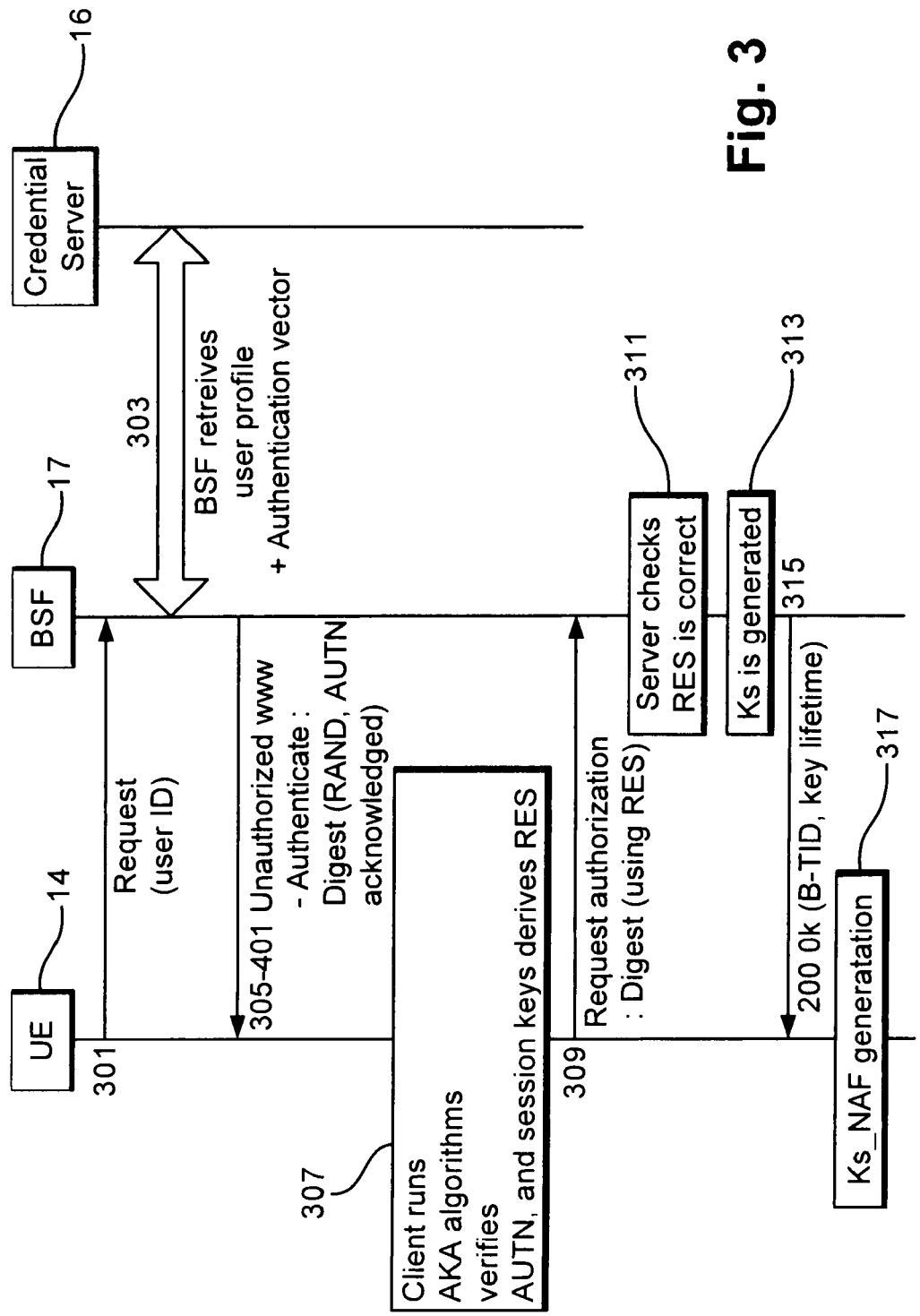
FIG. 3 shows a flowchart of the bootstrapping procedure as carried out in an embodiment of the present invention.

FIG. 3 shows the steps carried out within embodiments of the present invention in carrying out the bootstrapping authentication procedure. In another embodiment the NAF may push the security relevant data needed to create a security association between UE and NAF to the UE, after having communicated with the BSF. In another embodiment, the BSF may push the security relevant data needed to create the security association between UE and NAF to the UE.

In the first step 301 the user equipment transmits an authorisation request containing some form of user identification to the bootstrapping server function (BSF) 17. This user ID in the GBA-PKI and GBA-PW embodiments is the username value. The user ID in the GBA-LA embodiment used is the caller line identification value and/or IP address.

In the next step 303, the BSF 17, on receiving the user identification value communicates with the credential server 16 to retrieve the user profile (Prof) together any required authentication vector. The authentication vector includes a random number value (RAND), an authentication token (AUTN), an expected authentication response (XRES) and the shared identification value. In the prior art wireless communications environment the shared identification value (Ks). is stored in the UICC or similar smart card. In the GBA-PKI embodiment the shared identification value is the private key or any combination as described above comprising the private key. In the GBA-PW and GBA-LA embodiments the shared identification value is the password value (or in some embodiments the result of a one way function of the password value).

In the next step 305, the BSF 17 transmits a message to the UE 14 demanding the UE authenticates itself to the BSF 17. The message contains the random number value (RAND) and the authentication token (AUTN) received from the credential server.

In the next step 307, the UE 14 runs AKA algorithms as known in the art to verify the authentication token is correct. The UE 14 also generates a response message value (RES). In some embodiments of the present invention the UE does not use the AKA algorithm to authenticate the server, but other means to authenticate to the server, for example username/password, certificates, public/private key pairs, line identifier or similar means. In this embodiment the BSF and UE are both trusted and the BSF may not need to be authenticated. The BSF is trusted, but that do In the following step 309, the UE 14 transmits a request authorisation message to the BSF 17. The request message contains a response value (RES) which is used to verify that the user is the same user as requesting the authorization procedure.

In the following step 311, the BSF, on receipt of the request message transmitted in step 309, checks whether the received RES value matches the expected response value (XRES) already stored at the BSF 17. If the values match, the process progresses to step 313.

In step 313, the BSF 17 generates a bootstrapping transaction identification value (B-TID) which uniquely defines the bootstrapping.

In the next step 315, the BSF 17 transmits to the UE 14 an OK message containing the B-TID value and the Key lifetime value. The Key lifetime value defines the lifespan of this current bootstrapping in order to reduce the probability of non authorized access to the system.

On receipt of the ok message from the BSF 17, the user equipment 14 now derives cryptographic key material (Ks_NAF) which the UE can use to encrypt any data which would be sent to a network application function following this bootstrapping procedure and before the lifespan of the bootstrapping expires. The UE 14 uses the shared secret value to derive the key material (Ks_NAF).

The procedure for generating the key material (Ks_NAF) using UICC data is known in the art and is specified in 3GPP TS 33 220 V7.3.0 published in March 2006. In this the key material is generated by the function $$Ks\_NAF=KDF(Ks,\text{"gba-me"},RAND,IMPI,NAF\_ID)$$

where KDF is the known key distribution function, a mathematical function which generates cryptographical key material dependent on the parameters within the brackets and is described in Appendix B of 3GPP TS 33 220. The derivation parameters currently used as shown above are: the secret credential or key value Ks, the GBA type string "gba-me", the random number value received from the BSF 17 (RAND), the user's internet protocol multimedia private identity (IMPI), and the NAF identification value (NAF_ID).

In embodiments of the present invention the key derivation function as specified in the 3GPP document is used however the parameters differ.

In the GBA-PKI embodiments of the present invention the parameters used to generate the key material are:—

$$Ks\_PKI\_NAF=KDF(Ks,\text{"gba-pki"},RAND,\text{Public credential},NAF\_ID)$$

The GBA type string provides an indication of the basis of the bootstrapping i.e. "gba-pki". The secret credential value Ks in this embodiment of the present invention is a result of a one way function which at least contains the private key of the user (and may further contain the public key and whole certificate). The public (semi-public) credential in some PKI embodiments is the username value associated with the private key and in other embodiments the caller line identification value.

In the GBA-LA embodiments of the present invention the parameters used to generate the key material are:

Ks_LA_NAF=KDF(Ks,"gba-la",RAND,Public Credential,NAF_ID)

The GBA type string provides an indication of the basis of the bootstrapping i.e. "gba-la". The secret credential value Ks in this embodiment of the present invention is the password or result of the one way function of the password value as described above. The associated public (semi-public) credential in the line authentication embodiments is the caller line identification value as also described above.

In the GBA-PW embodiments of the present invention the parameters used to generate the key material are:

Ks_PW_NAF=KDF(Ks,"gba-pw",RAND,Public Credential,NAF_ID)

The GBA type string provides an indication of the basis of the bootstrapping i.e. "gba-pw". The secret credential value Ks in this embodiment of the present invention is the password or result of a one way function of the password value as described above. The associated public (semi-public) credential is the username value associated with the password.

In some embodiments of the present invention, the random number value is not used to derive the key material. In further embodiments of the present invention, the random number value is replaced by a token such as a time stamp received from the application server. In some embodiments of the GBA-PKI embodiments the password of the user is also included as a further parameter or is used to replace the RAND value.

Figure 4:
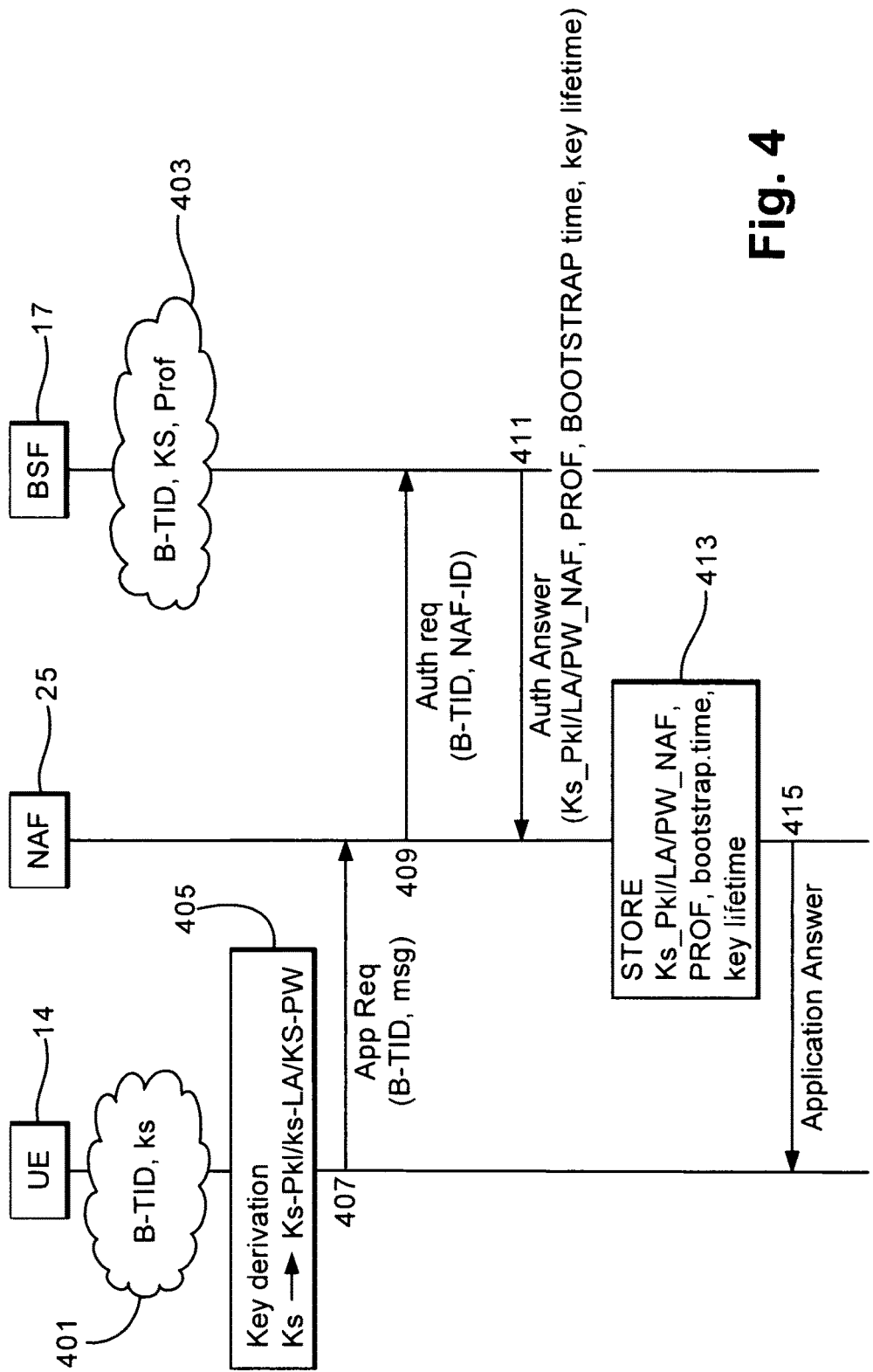
FIG. 4 shows a flowchart of an network application authentication procedure as carried out in an embodiment of the present invention.

FIG. 4 shows the method steps employed in embodiments of the present invention once the initial bootstrapping has been carried out in order that the UE with 'live' authentication keys authenticates itself with a network application function 25.

Steps 401, 403 and 405 show in summary the result of the steps carried out by the bootstrapping operation as shown in FIG. 3.

Step 401 shows that the UE has stored a bootstrapping transaction identification value (B-TID) and the shared identification value (Ks).

Step 403 shows that the bootstrapping serving function (BSF) 17 has a copy of the bootstrapping transaction ID value (B-TID), the shared identification value (Ks), and an application specific part of the user profile (PROF)—detailing any special instructions as to which parts of the application the user is authorized to access, for example an age certificate enabling the application function to block adult material for minors.

Step 405 shows the generation at the UE 14 of the Ks_NAF key material (the equivalent to step 317 from FIG. 3) from the PKI/LA/PW shared identification values as described above and using conventional Key Derivation Function (KDF) and AKA algorithms.

In step 407, the UE 14 makes an application request to the NAF 25 for access for a specific application. The application request contains the bootstrapping transaction identification value (B-TID). The request also contains application specific data (msg) such as the request for a specific element of the service required.

In step 409, following the receipt of the application receipt at the NAF 25, the NAF 25 transmits an authorisation request to the BSF 17. The authorisation request contains the bootstrap transaction ID (B-TID) received from the UE 14 together with the NAF ID value (NAF-ID).

In step 411, on receipt of the authentication request from the NAF 25, the BSF 17 generates the key material required by the NAF 25 to enable data to be encrypted between the UE 14 and the NAF 25. This key material Ks_NAF is generated according to the known key derivation function as previously described.

The BSF 17 also transmits an authorization answer to the NAF 25. The authorisation answer contains the generated key material Ks_NAF, and may also contain the application specific part of the user profile (PROF), the bootstrap time (BOOTSTRAP time) defining the time when the last bootstrapping process was carried out and the key lifetime (Key lifetime) which defines the time within which the generated key is valid—and if the generated key has a lifetime.

In step 413, the NAF 25 on receipt of the authorization answer, stores the application specific key material that was derived for the NAF, the application specific part of the user profile (PROF), the bootstrap time and the key lifetime.

In the step 415, the NAF 25, having stored the information, transmits an application answer 415 to the user equipment 14 in response to the application request from step 407.

Once this process has been completed both the UE and NAF now contain encryption key material within which data may be encrypted before transmission between each other or that may be used for authentication of the UE to the NAF.

The advantage with the embodiments of the present invention as described above can be described for example where the network application function is that of streaming digital video information containing digital rights management. This streaming can only be performed where the user is correctly authorized to access the material. For example the NAF should determine if the user has correctly purchased the material and also whether the user is suitable to view the material (for example in order to prevent adult themed material being accessed by minors). In using the credential server which can have a user name, password identifier pairing or other information stored on the credential server there is no requirement to have identity data permanently stored (in the case of the fixed security module) or semi permanently stored (in the case of the UICC security module) within the user equipment.

Furthermore this process can be used to access network application functions from fixed network resources as well as mobile network resources. It would be possible using embodiments of the present invention to access application servers and bootstrap and authenticate the user using the fixed network resource to connect to the application function using the same steps as described above.

A further advantage is that the private key identifier in the PKI embodiments is used only once during bootstrapping, and is not used between other server's. This therefore has additional security as fewer parties have access to the private key itself.

A further advantage is that the shared identifier Ks can be used directly without any requirement to generate instant private key identifiers (for example in preshared key-transport layer security (PSK TLS) and therefore no computationally complicated private key operations are required to be carried out for the client (excepting any private key recalculations after a specified time period—e.g. a day) and for the server.

Furthermore, there is no requirement for the UE to be able to handle revocation of the client's certificate in comparison to the Public Key Infrastructure (PKI) system. Although there is a requirement that the server BSF must contact the credential server in order to obtain the secret, this may be carried out in advance of demand when there is free processing time so that the user does not experience any significant delays in operation.

The above described operations may require data processing in the various entities. The data processing may be provided by means of one or more data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a location server.

In some embodiments of the present invention the BSF and credential server functionality is housed within a single server entity.

It is noted that whilst in the above embodiments are described in relation to user equipment such as mobile stations, embodiments of the present invention are applicable to any other suitable type of user equipment.

Furthermore although we have described the user equipment connecting to a network application function over a Ub interface. Same or similar secret credential and associated public or semi-public credential values could communicate over various communication interfaces. For example embodiments incorporating the GBA-PW embodiment as described above could be used for authentication on application function over normal HTTP Digest connections. Furthermore embodiments incorporating the GBA-PKI embodiments can be used for authentication and security over TLS handshake interfaces. In the transport layer for security (TLS) handshake embodiments the lifetime and B-TID values can be sent as one of the parameters in the TLS handshake as outlined by 3GPP TS33.222. Furthermore the secret credential in this embodiment (Ks) can be the agreed TLS master key. This master key could be used for any kind of service, independent on the device platform used.

It is also noted that even though the exemplifying communication system shown and described in more detail in this disclosure uses the terminology of the 3rd generation (3G) WCDMA (Wideband Code Division Multiple Access) networks, such as UMTS (Universal Mobile Telecommunications System) or CDMA2000 public land mobile networks (PLMN), embodiments of the proposed solution can be used in any communication system wherein advantage may be obtained by means of the embodiments of the invention. The invention is not limited to environments such as cellular mobile or WLAN systems either. The invention could be for example implemented as part of the network of computers known as the "Internet", and/or as an "Intranet". Furthermore the user equipment 14 in some embodiments of the present invention can communicate with the network via a fixed connection, such as a digital subscriber line (DSL) (either asynchronous or synchronous) or public switched telephone network (PSTN) line via a suitable gateway.

It is also noted that while the above describes exemplifying embodiments of the invention, there are several variations and modifications which may be made to the disclosed solution without departing from the scope of the present invention as defined in the appended claims.

The invention claimed is:

1. An apparatus comprising at least one processor and at least one memory including computer program code, the at least one memory and the computer program code configured to, with the processor, cause the apparatus to at least:
   receive, from a first node, a first identifier associated with the apparatus, the first identifier comprising at least a private identifier, wherein the private identifier is known only to the apparatus, the first node, and a second node;
   store the first identifier and a user identifier associated with the apparatus;
   transmit to the second node an authorization request comprising the user identifier, wherein the authorization request is configured to initiate authentication of the apparatus at the second node;
   receive, from the second node, a message comprising a second identifier used by the apparatus to authenticate the apparatus to a third node; and
   process the message to generate a cryptographic key configured to encrypt communications between the apparatus and the third node, the cryptographic key based on the processed message and the private identifier.

2. The apparatus of claim 1, wherein the user identifier is at least one of:
   a user name;
   a public cryptographic key;
   an IP address; and
   a caller line identification value.

3. The apparatus of claim 1, wherein the private identifier is at least one of:
   a password value; and
   a private cryptographic key.

4. A method comprising:
   receiving, by a user equipment and from a first node, a first identifier associated with the user equipment, the first identifier comprising at least a private identifier, wherein the private identifier is known only to the user equipment, the first node, and a second node;
   storing, at the user equipment, the first identifier and a user identifier associated with the user equipment;
   transmitting, from the user equipment and to the second node, an authorization request comprising the user identifier, wherein the authorization request is configured to initiate authentication of the user equipment at the second node;
   receiving, by the user equipment and from the second node, a message comprising a second identifier used by the user equipment to authenticate the user equipment to a third node; and
   processing, by the user equipment, the message to generate a cryptographic key configured to encrypt communications between the user equipment and the third node, the cryptographic key based on the processed message and the private identifier.

5. The method of claim 4, wherein the user identifier is at least one of:
   a user name;
   a public cryptographic key;
   an IP address; and
   a caller line identification value.

6. The method of claim 4, wherein the private identifier is at least one of:

a password value; and a private cryptographic key.

7. An apparatus comprising at least one processor and at least one memory including computer program code, the at least one memory and the computer program code configured to, with the processor, cause the apparatus to at least:

receive, from a user equipment, an authorization request comprising a user identifier associated with the user equipment;

transmit, to a second apparatus and upon receipt of the authorization request, a request for a user profile associated with the user equipment and an authentication vector, the authentication vector comprising a private identifier known only to the user equipment, the apparatus, and the second apparatus;

receive, from the second apparatus, the user profile and the authentication vector;

transmit, to the user equipment, a message comprising a first identifier used by the user equipment to authenticate the user equipment to a third apparatus;

generate a cryptographic key configured to encrypt communications between the user equipment and the third apparatus, the cryptographic key based on the message and the private identifier; and transmit, to the third apparatus and in response to an authentication message received from the third apparatus, the cryptographic key.

8. The apparatus of claim 7, wherein the user identifier is at least one of:

a user name;

a public cryptographic key;

an IP address; and a caller line identification value.

9. The apparatus of claim 7, wherein the private identifier is at least one of:

a password value; and a private cryptographic key.

* * * * *